United States Patent [19]

Megerle

[11] 4,206,188

[45] Jun. 3, 1980

[54] REMOVAL OF ACETYLENE FROM HCL STREAMS

[75] Inventor: Clifford A. Megerle, Oakland, Calif.

[73] Assignee: The Dow Chemical Company, Midland, Mich.

[21] Appl. No.: 966,927

[22] Filed: Dec. 6, 1978

[51] Int. Cl.$^2$ .............................................. B01D 53/34
[52] U.S. Cl. .................................... 423/245; 423/481; 423/488; 260/656 R
[58] Field of Search ..................... 423/240, 240 S, 241, 423/245, 245 S, 481, 488; 260/656 R

[56] References Cited

U.S. PATENT DOCUMENTS

| | | | |
|---|---|---|---|
| 2,965,439 | 12/1960 | Anderson et al. | 423/245 S |
| 3,398,508 | 8/1968 | Hart | 55/71 |
| 3,400,512 | 9/1968 | McKay | 55/69 |
| 3,446,586 | 5/1969 | Young | 423/488 |
| 3,681,014 | 8/1972 | Hackett et al. | 423/488 |
| 3,923,963 | 12/1975 | Rideout et al. | 423/481 |
| 3,979,502 | 9/1976 | Correla et al. | 423/488 |
| 4,035,473 | 7/1977 | Urioste et al. | 423/488 |

FOREIGN PATENT DOCUMENTS

| | | |
|---|---|---|
| 2353437 | 5/1975 | Fed. Rep. of Germany . |
| 2438153 | 2/1976 | Fed. Rep. of Germany . |
| 1090499 | 11/1967 | United Kingdom . |
| 1405714 | 9/1975 | United Kingdom ..................... 423/488 |

OTHER PUBLICATIONS

Chemical Abstracts, 79, 1973, 116657c.
Chemical Abstracts, 83, 1975, 15253x.

*Primary Examiner*—Earl C. Thomas
*Attorney, Agent, or Firm*—J. W. Ambrosius; G. D. Street

[57] ABSTRACT

Method of reducing the amount of acetylene impurity present in hydrogen chloride gas comprising contacting said gas with an oxidation catalyst in the presence of an oxygen-containing gas to form carbon monoxide and/or carbon dioxide and water. The method of the present invention is particularly adapted to remove acetylene impurities from hydrogen chloride streams used in the oxychlorination of ethylene in the presence of a catalyst.

5 Claims, No Drawings

REMOVAL OF ACETYLENE FROM HCL STREAMS

BACKGROUND

The present invention relates to the removal of acetylene present in an hydrogen chloride stream by reacting said stream with oxygen over an oxidation catalyst, thereby converting said acetylene to non-chlorinated hydrocarbon products, i.e., carbon monoxide and/or carbon dioxide.

It is commonly known in the art that 1,2-dichloroethane can be cracked at elevated temperatures to produce vinyl chloride monomer with hydrogen chloride being formed as a by-product. This HCl by-product is commonly recycled and used in the oxychlorination of ethylene to form 1,2-dichloroethane. However, in the thermal cracking step, small amounts of acetylene, e.g., typically 2000–3000 ppm, are formed and subsequently converted, in the oxychlorination step, to trichloroethane, tetrachloroethane and trichloroethylene. These materials are detrimental to the production of 1,2-dichloroethane as they are difficult to remove and, in the cracking step, form derivatives which inhibit the polymerization of the vinyl chloride monomer product.

While the concentration of acetylene in the HCl streams noted above typically is on the order of about 3000 ppm, this concentration is too low to permit economic recovery of the same or its derivatives in the 1,2-dichloroethane. Further, it is impractical to separate the acetylene from the HCl as the boiling points thereof are close together. In other processes, chlorination of the acetylene has been utilized, but the removal of the chlorinated reaction products from the HCl is also difficult and expensive. Adsorbtion of acetylene upon a solid adsorbent is effective, but the adsorbent must be periodically subjected to purging by an inert gas or liquid, necessitating the construction of two or more adsorption units and thereby entailing a high capital cost. Another difficulty with this type of process is the need to dispose of the gas or liquid stream contaminated with chlorocarbons formed during the purging step. Catalytic hydrogenation of acetylene to ethylene and ethane is also known; however, the cost and hazard associated with the handling of hydrogen are disadvantageous. Likewise, the high energy cost associated with the non-catalytic oxidation of acetylene at high temperatures of 400–500° is a disadvantage.

Accordingly, an object of the present invention is to provide a process for economically removing or reducing the concentration of acetylene in an HCl stream.

Another object of the present invention is to provide a process for improving the purity of the 1,2-dichloroethane produced in the oxychlorination of ethylene. A further object is to provide a process whereby the production of vinyl chloride or other chlorinated hydrocarbons from acetylene in the HCl stream is minimized or avoided and little or no vinyl chloride is formed. Finally, an important object of the present invention is to provide a process which requires temperatures no higher than those typically used in the oxychlorination of ethylene reaction, thus realizing energy savings over non-catalytic oxidation processes.

SUMMARY OF THE INVENTION

It has unexpectedly been discovered that acetylene present in hydrogen chloride can be reacted with an oxygen-containing gas in the presence of an oxidation catalyst to form a mixture of carbon monoxide, carbon dioxide and water, even in the presence of large amounts of hydrogen chloride. This result is surprising since it is known and expected that acetylene and hydrogen chloride would react in the presence of catalysts to form vinyl chloride, rather than acetylene oxidation products. The acetylene-containing hydrogen chloride stream treated by the process of the present invention can be utilized to provide higher purity 1,2-dichloroethane from the oxychlorination of ethylene than that which can be obtained when an acetylene-containing hydrogen chloride stream is used, even where the concentration of acetylene therein is quite low.

DETAILED DESCRIPTION

The present invention is directed to a method of reducing the acetylene content of an acetylene-containing hydrogen chloride gas which comprises reacting a stream comprising said acetylene-containing hydrogen chloride gas and an oxygen-containing gas in the presence of an effective noble metal oxidation catalyst at a temperature of at least about 100° C., said oxygen-containing gas being employed in an amount sufficient to provide at least about 3 ppm of oxygen per 1 ppm of acetylene per mole of hydrogen chloride and said stream being fed over said catalyst at a space velocity sufficient to provide conversion of acetylene to oxidation products thereof and a purified hydrogen chloride gas stream having a reduced acetylene content.

The oxygen-containing gas employed in the present process need not be pure oxygen. Inert diluents, such as, for example, nitrogen, water vapor, carbon monoxide, carbon dioxide, methane and other gaseous hydrocarbons may be present. Air may be used as the oxygen-containing gas. Amounts of oxygen in excess of the amount needed to oxidize acetylene may be beneficially carried over, in the purified hydrogen chloride stream, to the oxychlorination step where oxygen is a necessary feed material. Sufficient amounts of oxygen are added to the HCl gas to provide at least about the stoichiometric amount of oxygen needed to convert the acetylene, about 3 parts per million (ppm) of $O_2$ being stoichiometrically required per ppm of acetylene contained per mole of HCl. Thus, for example, an HCl gas containing about 1000 ppm acetylene (0.001 moles) per mole of HCl requires a stoichiometric amount of $O_2$ of about 0.003 moles per mole of HCl. Preferably, an excess stoichiometric amount of $O_2$ will be employed, about 0.05 moles of $O_2$ per mole of HCl being employed for practical reasons. The amount of oxygen employed primarily affects the $CO/CO_2$ ratio of the acetylene conversion products, and secondarily affects the acetylene conversion rate.

The stream, as said term is used in the specification and claims, comprises the acetylene-containing hydrogen chloride gas and the oxygen-containing gas, said gases being mixed to form said stream prior to or at the point of reaction over the catalyst. The space velocity of said stream, defined as the volume of gas under standard temperature and pressure conditions per volume of catalyst per hour of the stream (GHSV) and is expressed as $hr^{-1}$, is one which is sufficient to provide for removal of at least a portion of said acetylene by conversion thereof to carbon monoxide and/or carbon dioxide plus water (which are harmless diluents in an oxychlorination reaction—water also being a by-product thereof), thereby providing a hydrogen chloride gas having a reduced acetylene content. In some instances, such as where the initial acetylene content is not too excessive, it may not be necessary or desirable to achieve substantial or complete acetylene removal for a particular process application. While the scope of the present invention is intended to encompass such uses of the claimed method, it will obviously be desirable in methods of oxychlorinating ethylene to use said method to accomplish substantial or complete removal of acetylene from an hydrogen chloride gas without formation of vinyl chloride. Hence, in a preferred embodiment, a substantial amount, i.e., about 50% or more, of the acetylene content is removed from the HCl gas. In another preferred embodiment, the method of the present invention is carried out in a manner such that complete removal of the acetylene present in an HCl gas is achieved. In another preferred embodiment, the method of the present invention is carried out in a manner such that a hydrogen chloride gas stream is obtained having a reduced acetylene content and low amounts, e.g., about 5% or less by weight, of vinyl chloride. In a further preferred embodiment, the method of the present invention is carried out in a manner such that substantial or complete removal of the acetylene content of an HCl gas is achieved with the HCl product gas being free of vinyl chloride.

The foregoing can be accomplished by carrying out the method described herein in a fixed-bed or fluidized-bed reactor or by using two or more reactors in staged or series connection. The reactor is preferably made of a material which is inert to the catalyst and gas stream, such as tantalum, monel or the like. The exact size and capacity of the reactor or reactors will be apparent to those skilled in the art and will vary depending upon the particular HCl gas stream to be treated, the intended use thereof, the pressure, temperature, $O_2$—HCl mole ratios, space velocities, the degree of acetylene removal desired and the like. Generally, longer contact times of the stream with the catalyst are desired as better conversion of the acetylene can be achieved and lower, rather than higher, space velocities are accordingly employed. Space velocities (GHSV) of from about 5 or less to about 1000 or more $hr^{-1}$ can thus be employed, with lower rates of from about 5 to about 100 $hr^{-1}$ preferably being employed. A highly preferred space velocity used in the present invention is from about 5 to about 40 $hr^{-1}$ An effective oxidation catalyst employed in the present invention is one which is effective in the amount employed to catalyze the degradation of acetylene to carbon monoxide and/or carbon dioxide and/or water. The catalyst is a noble metal or oxide thereof and is preferably selected from the group consisting of palladium, platinum, rhodium, ruthenium, iridium and osmium. Preferably, the oxides are employed. The catalyst may be supported or unsupported, supported catalysts being preferred for reasons of cost. The support employed includes, for example, those such as alumina, silica, mixtures or compounds of alumina and silica, zeolite, carbon or silicon carbide, natural or synthetic faujasite and the like. The preferred support is alumina. Generally, the active catalyst amount ranges from about 0.5 to about 2.0 wt. % of the support. Not all catalysts are equivalent for the purpose of the present invention and varying degrees of acetylene conversion will be obtained with each. Further, certain catalysts will be more effective in converting acetylene while giving little or no formation of undesired vinyl chloride, which must be removed prior to use in the oxychlorination of ethylene. In a preferred embodiment of the present invention, an alumina-supported platinum catalyst is employed. The particle size and amount or volume of catalyst to be employed will vary depending on the reactor size, the type of reactor employed, the gas residence or contact time with the catalyst, e.g., total space velocity, and the like. Based on the specification teachings and examples herein, those skilled in the art will be able to readily determine the exact catalyst amount needed for a particular operation.

The method of the present invention can be conducted at a temperature of at least about 100° C. or more. Temperatures up to about 500° C. can be employed, with temperatures from about 100 to about 300° C. being preferred because of energy costs. A highly preferred temperature range is from about 200 to about 275° C. Generally, the acetylene-containing HCl gas and the oxygen-containing gas are preheated to the temperature of the catalyst prior to contact with the catalyst, although this is not essential. Such preheating can conveniently be accomplished by using a reactor packed with turnings or other materials, e.g., glass, alumina, tantalum turnings, etc., which can be heated to the desired temperature.

Atmospheric pressure can be employed as well as elevated pressures up to about 1000 psig or more. The preferred operating pressure is from about 5 to about 150 psig, with a range of from about 75 to about 125 being particularly preferred.

The best mode presently known for carrying out the invention comprises reacting a preheated stream of an acetylene-containing gas and an oxygen-containing gas providing about 0.2 mole of $O_2$ per mole of HCl over an alumina-supported platinum catalyst at a temperature of about 225° C., a pressure of about 5 psig and a total space velocity of about 33.5 $hr^{-1}$.

The following examples illustrate the practice of the present invention.

EXAMPLE 1

A fixed bed tantalum reactor (4 feet long and ¾" in diameter) was fitted with a tantalum thermocouple well and controllers and filled (to a depth of about one and one-half feet) with about eight cubic inches of tantalum turnings, which, when heated, serve to preheat gas streams introduced into the reactor prior to contact with the catalyst. About thirteen cubic inches of a platinum catalyst containing about 0.5 wt. % platinum deposited on ⅛" alumina pellets was then placed into the reactor behind the tantalum turnings. The tantalum turnings were heated to about 225° C. and a gas stream comprising hydrogen chloride, acetylene and oxygen was fed into the reactor and contacted with the tantalum turnings and catalyst. The temperature of the reactor was maintained at about 225° C. The molar ratio of HCl to acetylene in the gas stream was about 333:1 (e.g., about 3000 ppm acetylene) and the HCl:$O_2$ mole ratio was about 5:1 (about 0.2 mole of $O_2$ per mole of HCl). The gas stream was introduced at a pressure of about 5 psig and a space velocity of about 33.5 $hr^{-1}$. The gas stream exiting the reactor was analyzed by gas chromatographic means and it was found that about 66% of the acetylene initially present in the gas stream had been converted to carbon monoxide (48%) and carbon dioxide (52%). Less than one percent vinyl chloride was observed in the product gas stream.

The above example demonstrates the operability of the process under a particular set of reaction parameters. Higher conversion rates of acetylene can be obtained by using a longer reactor to obtain longer residence or contact time with the catalyst, varying the space velocity or $HCl:O_2$ ratios, and the like.

EXAMPLE 2

Using the same reactor, catalyst and conditions, as noted in Example 1, except that the total space velocity of the gas stream was about 67 $hr^{-1}$ and excess $O_2$ (an $HCl:O_2$ ratio of 1:1), about 61% of the acetylene was converted entirely to $CO_2$, the product stream being entirely free of vinyl chloride.

EXAMPLE 3

Using the same reactor and conditions of Example 1, except that a commercially available synthetic Y-type zeolite loaded with a palladium catalyst (believed to be about 1 wt. %), a total space velocity of about 94 $hr^{-1}$, and an $HCl:O_2$ molar ratio of 1:2.5, 57% of the acetylene initially present in the gas stream was found to be converted to carbon monoxide (57%) and carbon dioxide (43%), the product stream being entirely free of vinyl chloride.

Various modifications may be made in the process of the present invention without departing from the spirit or scope thereof and is to be understood that the invention is limited only as defined in the appended claims.

What is claimed is:

1. A method for reducing the acetylene content of an acetylene-containing hydrogen chloride gas which comprises reacting a stream comprising said acetylene-containing hydrogen chloride gas and an oxygen-containing gas in the presence of an effective noble metal oxidation catalyst at a temperature of at least about 100° C., said oxygen-containing gas being employed in an amount sufficient to provide at least about 3 ppm of oxygen per 1 ppm of acetylene per mole of hydrogen chloride and said stream being fed over said catalyst at a space velocity sufficient to provide conversion of acetylene to oxidation products thereof and a purified hydrogen chloride gas stream having a reduced acetylene content and low amounts of vinyl chloride.

2. The method of claim 1 wherein a substantial amount of the acetylene is converted.

3. The method of claim 1 wherein the purified hydrogen chloride gas contains no vinyl chloride.

4. The method of claim 1 wherein substantial or complete conversion of acetylene is obtained.

5. The method of claim 4 wherein the purified hydrogen chloride gas contains no vinyl chloride.

* * * * *